(12) United States Patent
Laudet et al.

(10) Patent No.: US 6,699,322 B2
(45) Date of Patent: Mar. 2, 2004

(54) COMPOSITIONS FOR TREATING SOILS, THE PROCESS FOR THEIR PREPARATION AND THE USE THEREOF

(75) Inventors: Alain Laudet, Namur (BE); Etienne Van Tichelen, Wanze (BE); Daniel Antoine Angel Puiatti, Villemomble (BE); Lucien Marie Louis Joseph Destexhe, Amay (BE)

(73) Assignee: S.A. Lhoist Recherche et Developpment, Brussels (BE)

( * ) Notice: Subject to any disclaimer, the term of this patent is extended or adjusted under 35 U.S.C. 154(b) by 2 days.

(21) Appl. No.: 10/122,291

(22) Filed: Apr. 12, 2002

(65) Prior Publication Data

US 2002/0152933 A1 Oct. 24, 2002

Related U.S. Application Data

(62) Division of application No. 09/068,567, filed on Jul. 21, 1999, now Pat. No. 6,406,538, which is a continuation of application No. PCT/BE97/00130, filed on Nov. 25, 1997.

(30) Foreign Application Priority Data

Nov. 26, 1996 (BE) .............................................. 9600987

(51) Int. Cl.⁷ ................................................ C04B 2/02
(52) U.S. Cl. ........................ 106/900; 106/792; 106/795
(58) Field of Search ................................ 106/900, 792, 106/795

(56) References Cited

U.S. PATENT DOCUMENTS

| | | | |
|---|---|---|---|
| 3,620,972 A | 11/1971 | Fite ................................ | 252/1 |
| 3,854,968 A | 12/1974 | Minnick et al. ............ | 106/109 |

(List continued on next page.)

FOREIGN PATENT DOCUMENTS

| | | |
|---|---|---|
| DE | 1 667178 | 6/1971 |
| DE | 99174 | 7/1973 |
| EP | 0 136 447 | 4/1985 |
| EP | 0 320 987 | 6/1989 |
| EP | 0 406 903 | 1/1991 |
| FR | 2 709 766 | 9/1993 |
| FR | 2 719 053 | 4/1994 |
| JP | 06-219804 | 8/1994 |
| JP | 06-3222357 | 11/1994 |
| JP | 08-073252 | 3/1996 |
| WO | WO 95/00031 | 1/1995 |
| WO | WO 96/00199 | 1/1996 |
| WO | PCT/BE97/00130 | 11/1997 |

OTHER PUBLICATIONS

Bulletin de Liaison des Laboratoires des ponts et Chaussees, No 198, Jul./Aug. 1995.
Abstract of JP 80037521; Sep. 29, 1980.
Abstract of JP 53050079; May 8, 1978.
Abstract of JP 05320642; Dec. 3, 1993.
Abstract of JP 61053172; Mar. 17, 1996.
Abstract of JP 60014917; Jan. 25, 1985.
Abstract of JP 55037521; Sep. 29, 1980.
Abstract of JP 49111882; Oct. 24, 1974.
Abstract of JP 920073613; Feb. 13, 1992.
Abstract of JP 5222366; Aug. 31, 1993.
Abstract of JP 820064268; Apr. 16, 1982.
Abstract of JP 58180225; Oct. 21, 1983.

*Primary Examiner*—Paul Marcantoni
(74) *Attorney, Agent, or Firm*—Charles D. Gunter, Jr.

(57) ABSTRACT

Composition for treating and stabilizing soils, in particular wet soils, comprising, in the form of a powder having a particle size less than 5 mm, quicklime and/or calcium-based hydraulic binders, as well as a non-aqueous fluid additive capable of agglomerating the finer particles of the composition together.

10 Claims, 1 Drawing Sheet

U.S. PATENT DOCUMENTS

| | | | |
|---|---|---|---|
| 3,876,439 A | 4/1975 | Schneider | 106/287 |
| 3,913,637 A | 10/1975 | Seals | 141/151 |
| 3,980,489 A | 9/1976 | Schneider | 106/287 |
| 3,980,490 A | 9/1976 | Schneider | 106/287 |
| 4,233,015 A | 11/1980 | Teague et al. | 405/263 |
| 4,276,308 A | 6/1981 | Ito et al. | 424/304 |
| 4,328,037 A | 5/1982 | Demirel et al. | 106/85 |
| 4,469,612 A | 9/1984 | Fenton | |
| 4,545,820 A | 10/1985 | Mallow | 106/76 |
| 4,618,369 A | 10/1986 | Smith-Johannsen | 106/95 |
| 4,663,067 A | 5/1987 | Mallow et al. | 252/88 |
| 5,018,906 A | 5/1991 | Bonier-Sahuc | 405/263 |
| 5,235,070 A | 8/1993 | Green et al. | 549/203 |
| 5,362,566 A | 11/1994 | George et al. | 428/403 |

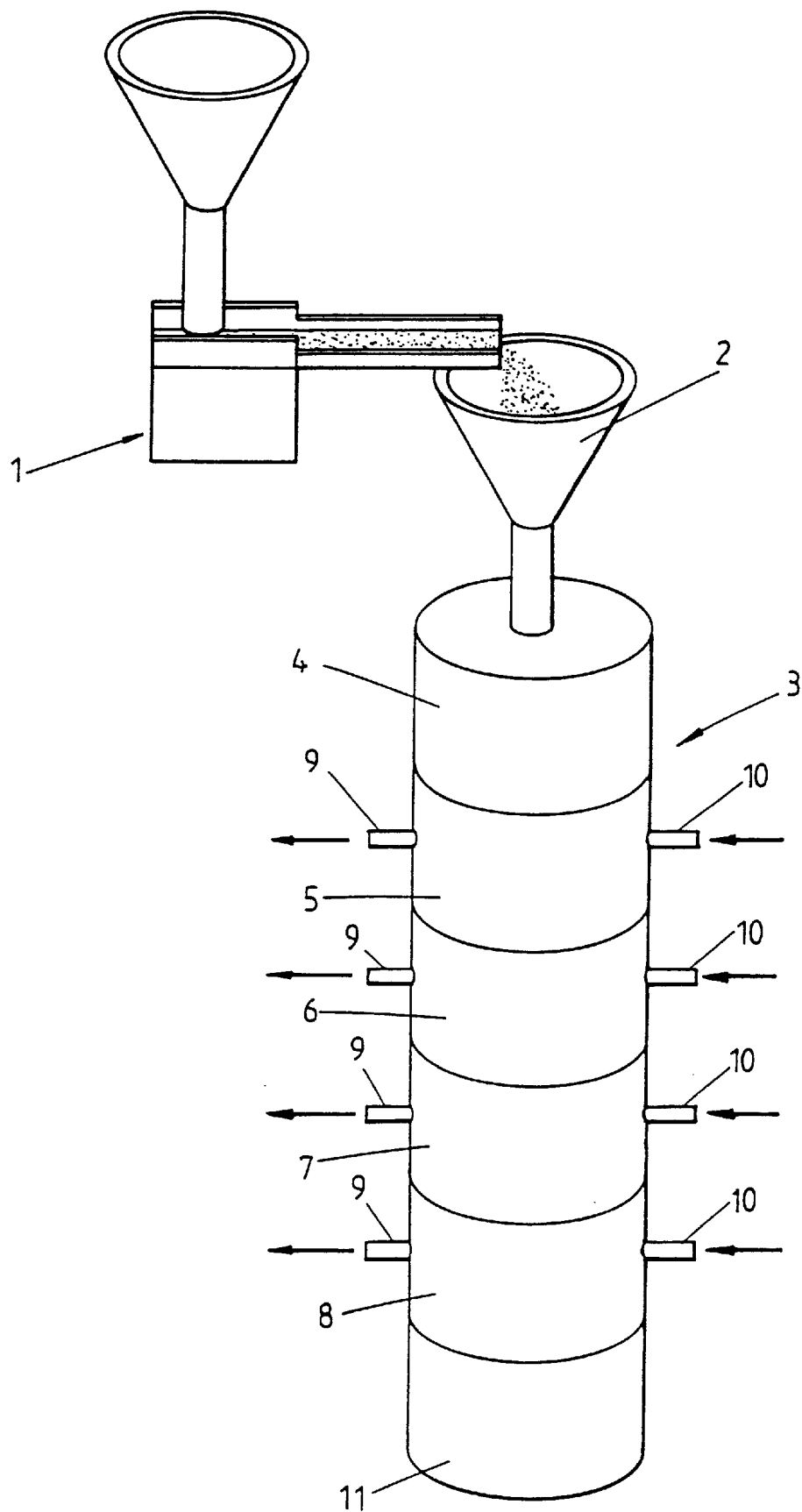

US 6,699,322 B2

COMPOSITIONS FOR TREATING SOILS, THE PROCESS FOR THEIR PREPARATION AND THE USE THEREOF

This application is a div. of 09/068,567 filed Jul. 21, 1999 now U.S. Pat. No. 6,406,538 which is a 371 of PCT/BE97/00130 filed Nov. 25, 1997.

FIELD OF THE INVENTION:

The present invention relates to a composition for treating and stabilizing soils, in particular wet soils, comprising, in the form of a powder having a particle size less than 5 mm, quicklime and/or calcium-based hydraulic binders, to the process for preparing such a composition and to the use thereof.

DESCRIPTION OF THE PRIOR ART:

It is known to treat soils, in particular wet soils, in order to dry them and stabilize them, in particular when these soils are intended to serve as foundations for large construction works, such as the construction of roads, car parks, etc. To this end, the soil is mixed with a powdered hydraulic binder or powdered quicklime. These treatments include transferring powdered quicklime or hydraulic binder from the storage reservoir of a spreading vehicle, spreading the powder on the soil to be treated and blending the powder with the soil to be treated, for example by ploughing. In order to achieve suitable transfer conditions, the powder used must be very fluid, i.e. it must have a suitable particle size so that it will flow freely through pipes where transfer is normally made by a pneumatic method. It is moreover appropriate to use a quicklime or binder having a sufficiently fine particle size so as to obtain a dispersion which is as uniform as possible in the soil to be treated and good reactivity. It is usually recommended for example for the foundations of roads, that the quicklime has a particle size which does not exceed 2 mm (see French standard NFP 98-101.

The use of such powders for the treatment of soils has however a certain number of disadvantages, the main one consisting of the emission of lime dust and/or hydraulic binder dust during the treatment described above both during spreading as well as during ploughing. In the presence of wind, it is sometimes possible to observe the transfer of the treatment product by the wind more than 20 to 30 meters from the site area. When this dust is deposited on damp supports or on any unprotected living body, the result is a sudden rise in pH (in the case of lime in particular) or adhesion of the product on these supports following hydraulic setting. The aforementioned dust emissions may thus be aggressive to the environment (corrosion, damage to neighbouring cultivation etc.) and have the effect of leaving visible and tenacious residues on surfaces which it covers, which are unsightly for example in an urban environment (see for example M. SCHAEFFNER and J.-C. VALEUX, Emissions de poussières de chaux et/ou de liants hydrauliques sur les chantiers de traitement de sols et de retraitement de chaussées, réalitéet remèdes; Bulletin de liaison des laboratoires des Ponts et Chaussées, [Dust emissions from lime and/or hydraulic binders on sites where soils are treated and roadways retreated; reality and remedies; Liaison bulletin of the Highways and Bridges Department], 198, July-August 1995).

Processes are known for stabilizing soils in earthworks or for road foundations comprising spreading a lime wash onto the soil to be treated. This type of treatment is only applicable in the case of dry soils, for example in very sunny regions. It is inapplicable in the case of moderately to very wet soils.

A product is also known for stabilizing soil in civil engineering products, including slaked lime, anhydrous or hydrated gypsum and water or an aqueous solution containing an anti-dust agent (see Derwent abstract of JP-5222366 : access number 93-309364). This product uses water or an aqueous solution and, as for the lime wash, it is thus absolutely inappropriate to treat and stabilize soils which are moderately to very wet, as in the case of the present invention.

A surface treatment is also known with quicklime powder, in which the particles of quicklime are coated with an organic compound preferably in solution in an organic solvent. Once these particles are completely coated, the quicklime powder has a distinctly increased resistance to humidity and increased fluidity which improves the conditions of transport and storage (see Japio abstract of JP-58180225). However, when it is necessary to use the powder, it is first necessary to restore its intrinsic reactivity by heating it for ten minutes at approximately 400° C. This obviously does not enable it to be considered for the application aimed at by the present invention.

SUMMARY OF THE INVENTION:

The object of the present invention is to develop a composition for treating and stabilizing soils which meets the requirements of State regulations, while overcoming the disadvantages mentioned above, as well as a process for preparing such a composition and the use thereof.

These problems are resolved by a composition such as indicated at the beginning, additionally including a non-aqueous fluid additive having the power to agglomerate the finer particles of the composition. Advantageously, the composition has a particle size distribution in which the particles smaller than 32 $\mu$m represent less than 30% of the total composition, advantageously less than 20% thereof, preferably less than 10% thereof. Also preferably, the composition has a particle size distribution in which the particles larger than 1 mm represent less than 20% of the total composition, advantageously less than 10% and preferably less than 1%.

BRIEF DESCRIPTION OF THE DRAWINGS:

FIG. 1 is a view of a test rig used in the laboratory for measuring the emission of dust.

DETAILED DESCRIPTION OF THE INVENTION:

Quicklime, according to the invention, means lime obtained by firing calciferous materials. A quicklime contains essentially calcium oxide, sometimes with a small magnesium oxide content.

Calcium-based hydraulic binder means cements, for example Portland cement, mixtures of blast furnace slag, fly ash or natural pozzolans and lime, as well as possibly gypsum, sulphocalcic ash etc.

Quicklimes and hydraulic binders for roads usually employed generally have more than 50%, and sometimes even more than 60% of particles smaller than 32 $\mu$m. Application to the powdered composition of a non-aqueous additive according to the invention, reduces this fraction of particles smaller than 32 $\mu$m by a half and in certain cases by more than 10 times, sometimes by 30 times, while retaining the larger particle size fractions in approximately the same proportions. The result is a distinct reduction in dust emission, without any adverse influence on the capacity of the product to flow and on its reactivity.

According to one advantageous embodiment of the invention, the said additive is hydrophobic and loses its power of agglomeration when at least part of the quicklime or of the hydraulic binder is hydrated. Consequently, the finer particles are liberated and distributed in the soil to be treated and stabilized in the presence of humidity in the soil, whereas they are no longer in a condition to be dispersed by a side wind. A product can be obtained in this way that is just as effective and acts just as uniformly in the soil as known products currently in use, based exclusively on quicklime or hydraulic binder, without the disadvantages of these latter already mentioned.

According to a particular form of the invention, the said additive can be evaporated at least partially at the temperature of the reaction between quicklime or hydraulic binder and water. As is known, quicklime reacts exothermically with water and hydraulic binders undergo a setting reaction in the presence of water that is also exothermic. After blending the composition according to the invention with a soil, the humidity in the latter reacts with the quicklime or the hydraulic binder, with evolution of heat. This heat may assist in the open air in evaporating the non-aqueous fluid additive which then liberates the finer particles, temporarily agglomerated by it in the stored product.

The additive according to the invention is preferably a compound selected from the group comprising mineral oils and polyolefins and mixtures thereof. As the mineral oil, the composition according to the invention may include white mineral oil, which is preferably free from or almost free from an aromatic fraction and polynuclear compounds.

Embodiments of the compositions according to the invention are indicated in particular in the claims which follows.

The object of the invention is also a process for preparing a composition for treating and stabilizing soils.

According to one embodiment of the invention, this process may comprise grinding a quicklime or a calcium-based hydraulic binder into a finely powdered form, adding the fluid additive to the powder and blending the composition obtained. During this blending, a temporary agglomeration is obtained of the finer particles of the composition by the non-aqueous fluid additive, an agglomeration which will preferably disappear after spreading, in particular by hydration of the quicklime or of the binder which gives rise to a loss of agglomerating power by the additive according to the invention.

According to another embodiment of the invention, the process may also comprise adding the fluid additive to the quicklime or the hydraulic binder and grinding the quicklime or the hydraulic binder into a powder during or after the said addition, with simultaneous blending. This process has the advantage of grinding and blending in a single step.

If, at ambient temperature, the fluid additive is somewhat too viscous, provision can be made to preheat this prior to adding it. It may be considered that the kinematic viscosity of the fluid additive at the moment it is added should preferably not exceed 20 centipoise and even preferably 15 centipoise. Addition at 40° C. may for example be considered.

The invention also concerns the use of a composition such as described above for use in the treatment and stabilization of soils, in particular soils that are moderately wet, for example wet clay, loamy or chalky soils. Use will for example be made of such compositions for fill material, road foundations, the retreatment of old roadways, the formation of industrial platforms, the creation of road systems in urban housing estates or in farming areas.

Other details and special features of the invention will become apparent from the description given below of non-limiting examples of embodiments

EXAMPLE 1

10 g of white mineral oil were sprayed onto 1 kg of quicklime as used on roads. The mixture was then blended for 10 minutes in a laboratory bowl blender (Hobart blender).

The white mineral oil was a mixture of alkanes and cycloalkanes to the extent of 68 and 32% respectively with an aromatics content less than 1 ppm and a polynuclear compounds less than 1 ppb. Its average molecular weight was between 340 and 360. Its kinematic viscosity at 40° C. was 15 centipoise.

The test rig used in the laboratory for measuring the emission of dust is shown in the accompanying single figure. It comprises:

a vibrating metering device 1, known in the art, a funnel 2, a column 3 with stackable cylindrical elements, the upper one 4 of which supports the funnel 2, each of the following four elements 5–8 being provided with a connector 9 connected to a suction pump, not shown, via a collector, and with a connector 10 acting as an air inlet, a receptacle 11, placed at the base of the column 3 (200 mm in diameter), the said suction pump, two valves, not shown, to regulate the reduction in air pressure, and a U-shaped manometer also not shown.

This device made it possible to simulate the fall of lime in the presence of a side wind which was created by putting the device under reduced pressure (100 mm of water column). After the fall, the weight was determined of the powder collected at the base of the column 3, and consequently the percentage lime carried by the movement of air.

After a kilo of untreated quicklime had fallen, 897 g of lime were collected in the receptacle 11, which corresponded to a loss of 10.3%. During an identical test with quicklime, following treatment according to the invention, 948 g were recovered, i.e. a loss of 5.2%. The treatment had thus resulted in a reduction of ±50% in the dust emission. The particle size distribution of the untreated lime and of the treated lime, measured by sieving under reduced air pressure (equipment constructed by Alpine), as well as their reactivities, are shown in the table below

| Particle size distribution | Untreated lime | Treated lime |
| --- | --- | --- |
| <32 μm | 47.8% | 7.4% |
| 32–45 μm | 6% | 17.8% |
| 45–63 μm | 5.2% | 9.2% |
| 63–90 μm | 6.2% | 16.4% |
| 90–160 μm | 11.4% | 19.4% |
| 160–250 μm | 7.2% | 7.4% |
| 250–500 μm | 11.8% | 14.6% |
| 0.5–1 mm | 4.2% | 6.2% |

| Particle size distribution | Untreated lime | Treated lime |
| --- | --- | --- |
| >1 mm | 0.2% | 1.6% |
| Reactivity | 6.3 minutes | 7.3 minutes |

The determination of the reactivity of the limes was based on the exothermic nature of the hydration reaction of quicklime. It consisted of measuring the rise in temperature with time. These measurements were carried out in accordance with the DIN standard 1060 (Part 3—test method 10) of 1982. The results were expressed as the time necessary, from the start of the hydration reaction of 150 g of quicklime with 600 g of water, to reach a temperature of 60° C., the initial temperature being 20° C.

EXAMPLE 2

10 g of poly-alpha-olefin (Nextbase 2002 from NESTE) were sprayed onto 1 kg of quicklime as used on roads. The mixture was then blended for 10 minutes in a laboratory bowl blender (Hobart blender). Before treatment, the percentage dust emission measured by the laboratory fall test as described in example 1 was 11.1%. It was 5.3% for treated lime, i.e. a reduction in dust of ±52%. The particle size distribution of the untreated lime and of the treated lime as well as their reactivities, are shown in the table below

| Particle size distribution | Untreated lime | Treated lime |
| --- | --- | --- |
| <32 μm | 51.2% | 6% |
| 32–45 μm | 5.2% | 15.2% |
| 45–63 μm | 6.4% | 9.6% |
| 63–90 μm | 6.8% | 23.6% |
| 90–160 μm | 12.4% | 20.8% |
| 160–250 μm | 7.2% | 6.4% |
| 250–500 μm | 8% | 13.6% |
| 0.5–1 mm | 2.8% | 4.4% |
| >1 mm | 0% | 0.4% |
| Reactivity | 6.7 minutes | 7.4 minutes |

EXAMPLE 3

10 g of poly-intra-olefin (MX 2101 from MIXOIL) were sprayed onto 1 kg of quicklime as used on roads. The mixture was then blended for 10 minutes in a laboratory bowl blender (Hobart blender). Before treatment, the percentage dust emission measured by the laboratory fall test as described in example 1 was 8.8%. It was 3% for treated lime, i.e. a reduction in dust of ±66%. The particle size distribution of the untreated lime and of the treated lime, as well as their reactivities, are shown in the table below

| Particle size distribution | Untreated lime | Treated lime |
| --- | --- | --- |
| <32 μm | 55.6% | 8% |
| 32–45 μm | 4% | 12% |
| 45–63 μm | 5% | 9.6% |
| 63–90 μm | 5.8% | 22.4% |
| 90–160 μm | 9.8% | 24% |
| 160–250 μm | 6.8% | 7.2% |
| 250–500 μm | 9.2% | 11.2% |
| 0.5–1 mm | 3.6% | 4.8% |
| >1 mm | 0.2% | 0.8% |
| Reactivity | 6.7 minutes | 7 minutes |

EXAMPLE 4

One tonne of quicklime as used on roads was treated in an industrial blender-granulator of the zigzag type, fitted with dispersing bars and knives (GRC 300 constructed by GMV Impianti/Italy). A white mineral oil, such as described in example 1 was metered, to the extent of 1%, by means of a volumetric pump and dispersed in the mass of lime by the centrifugal force produced by the rotation of the knives. The percentage dust emission measured by the laboratory fall test of example 1 was 8.1% before treatment of the lime and 3.4% for the treated lime, i.e. a reduction in dust of ±58%. The particle size distribution of the untreated lime and of the treated lime as well as their reactivities, are shown in the table below:

| Particle size distribution | Untreated lime | Treated lime |
| --- | --- | --- |
| <32 μm | 57.8% | 2.6% |
| 32–45 μm | 4.8% | 4.4% |
| 45–63 μm | 4.4% | 3.8% |
| 63–90 μm | 5% | 9% |
| 90–160 μm | 8.8% | 22% |
| 160–250 μm | 5.8% | 14.7% |
| 250–500 μm | 9.2% | 8.1% |
| 0.5–1 mm | 3.8% | 25% |
| >1 mm | 0.4% | 10.4% |
| Reactivity | 4 minutes | 5.6 minutes |

EXAMPLE 5

Thirty tonnes of quicklime 5–15 mm in size were ground in an industrial installation having at the entry point a hammer mill fitted with a watering bar. The additive (white mineral oil) was injected onto the lime as it entered the mill, at a rate of 13 kg per tonne of lime. A quicklime, as used on roads was obtained after milling with a particle size of less than 2 mm. This product was then homogenized during its transfer by a screw in cascades to the storage silo. The percentage dust emission measured by the laboratory fall test was 8.5% before treatment of the lime and 4.2% for the treated lime, i.e. a reduction in dust of ±50%. The particle size distribution of the untreated lime and of the treated lime as well as their reactivities, are shown in the table below

| Particle size distribution | Untreated lime | Treated lime |
| --- | --- | --- |
| <32 μm | 55.2% | 2.2% |
| 32–45 μm | 4% | 9.4% |
| 45–63 μm | 5.6% | 3.4% |
| 63–90 μm | 5.6% | 8.6% |
| 90–160 μm | 9.6% | 30.2% |
| 160–250 μm | 7.2% | 8.4% |
| 250–500 μm | 9.2% | 18.6% |

-continued

| Particle size distribution | Untreated lime | Treated lime |
|---|---|---|
| 0.5–1 mm | 3.6% | 13.6% |
| >1 mm | 0% | 5.6% |
| Reactivity | 3.45 minutes | 4.3 minutes |

A comparative measurement of dust emission during spreading on site of the treated and untreated road quality quicklime was made by the Centre technique des Industries Aerauliques et Thermiques (CETIAT, 69604 Villeurbanne/France). The determination of the average level of dust emission on the borders of the site where spreading was carried out consisted of aspirating and filtering a known volume of air and then weighing the collecting filter. The dust concentration was defined as the ratio of the mass of solid particles retained by the filter and the volume of air sampled. It was expressed in $Mg/m^3$ of air. Various samples were taken at a height of between 1 and 1.5 m, with the aid of an apparatus according to French standard NF X 43-021 relating to the "Sampling on a filter of particulate materials in the ambient air". These measurements demonstrated that the concentration of dust during the spreading of treated quicklime was at least ten times less than that measured during the spreading of untreated quicklime. In the example carried out, there was obtained, in the presence of a side wind of 3 m per second, a mean concentration up to 20 m from the spreading area, of between 45 and 50 $mg/m^3$ for untreated lime, whereas under the same conditions, a means value of the order of 3 $mg/m^3$ was obtained for the lime treated according to the invention.

EXAMPLE 6

Thirty tonnes of lime as used on roads were ground and treated in the installation and according to the conditions described in example 5, but with the addition of white mineral oil at a rate of 6 kg per tonne of lime. The percentage dust emission measured by the laboratory fall test was 10.1% before treatment and 4.4% for the treated lime, i.e. a reduction in dust of ±55%. The particle size distribution of the untreated lime and of the treated lime as well as their reactivities, are shown in the table below

| Particle size distribution | Untreated lime | Treated lime |
|---|---|---|
| <32 μm | 48.6% | 2.8% |
| 32–45 μm | 6.2% | 6.2% |
| 45–63 μm | 4.6% | 5.8% |
| 63–90 μm | 5.2% | 11.8% |
| 90–160 μm | 10.6% | 32.2% |
| 160–250 μm | 8.6% | 9.6% |
| 250–500 μm | 11.6% | 17.2% |
| 0.5–1 mm | 4.4% | 12.2% |
| >1 mm | 0.2% | 2.2% |
| Reactivity | 3.9 minutes | 4.1 minutes |

EXAMPLE 7

10 g of poly-intra-olefin (MX 2101 from MIXOIL) were sprayed onto 1 kg of Portland cement compound (CPJ-CEM II/A). The mixture was then blended for 10 minutes in a laboratory bowl blender (Hobart blender). Before treatment, the percentage dust emission measured by the laboratory fall test was 12.5%. It was 7.7% for the treated cement, i.e. a reduction of dust of ±46%.

The particle distribution measured by sieving under reduced air pressure (Alpine) was as follows

| Particle size distribution | Untreated cement | Treated cement |
|---|---|---|
| <32 μm | 64.6% | 15.6% |
| 32–45 μm | 14.4% | 33.8% |
| 45–63 μm | 11% | 9.6% |
| 63–90 μm | 7% | 28.4% |
| 90–160 μm | 2.8% | 12% |
| 160–250 μm | 0.2% | 0.6% |
| 250–500 μm | 0% | 0% |
| 0.5–1 mm | 0% | 0% |
| >1 mm | 0% | 0% |

EXAMPLE 8

10 g of poly-alpha-olefin (Nextbase 2002 from NESTE) were sprayed onto 1 kg of hydraulic road binder. This hydraulic road binder was a mixture of vitrified blast furnace slag, lime and gypsum. All were blended for 10 minutes in a laboratory bowl blender (Hobart blender). Before treatment, the percentage dust emission measured by the laboratory fall test of example 1 was 14.1%. It was 8.1% for the treated hydraulic binder, i.e. a reduction in dust of ±41%.

The particle distribution measured by sieving under reduced air pressure (Alpine) was as follows

| Particle size distribution | Untreated hydraulic binder | Treated hydraulic binder |
|---|---|---|
| <32 μm | 52.6% | 14.2% |
| 32–45 μm | 13.2% | 36% |
| 45–63 μm | 13% | 17.4% |
| 63–90 μm | 12% | 20.6% |
| 90–160 μm | 8.2% | 9.8% |
| 160–250 μm | 1% | 0.8% |
| 250–500 μm | 0% | 0.2% |
| 0.5–1 mm | 0% | 0% |
| >1 mm | 0% | 0% |

As can be seen in all these examples 1 to 8, there was a distinct reduction in the finer particle size fractions in the compositions treated, and the maintenance of, or an insignificant increase in the coarser particle size fractions. On the other hand, a distinct increase was observed of the average particle size fractions 63 to 160 μm, possibly 250 μm for quicklime, and 32 to 90 μm for cements and other binders.

This modification of the particle size proportion had no real effect on the reactivity of the limes, nor on their capacity for flow.

As can be seen in example 9 below, the effects of quicklime on natural soils are not affected any more by the treatment of these limes according to the invention.

EXAMPLE 9

Investigations were carried out in the laboratory to determine the effect of the anti-dust treatment on the properties of a road quicklime, the particles of which had a size of less than 2 mm, in accordance with the French standard NE P 98–101 (June 1991). After characterizing the lime before and after treatment according to the invention, the tests have consisted to measure the effects of the used compositions, as mechanical performances and dimensional stability, on a limon from the Paris area (plasticity index: 12 to 15).

The fact was established that the treating according to the invention does not modify significantly the reactivity of the lime but the apparent particle size distribution was modified and the treated lime became hemometric.

The effects on loam were measured by means of the IPI test (Indice Portant Immediat according to the French Standard NF P 94–078 of December 1992) and by the CBR test (Californian Bearing Ratio according to the French standard NF P 94–078 of December 1992) after immersion in water for four days. For each of the two types of lime, two additions were made 1.5 and 3% based on the weight of dry soil. The initial water contents of the soil, before treatment, were 19 and 21%, which corresponded to WOPN +2 and WOPN +4 (Standard Proctor Test according to the French Standard NF P 94–093 of December 1993).

The results were as follows

Whatever the type of lime and moreover all things being equal, (initial water content of the soil, density of the samples tested and the amount of lime added) the IPIs after treatment with lime were distinctly greater than those measured before treatment and they reached comparable levels, taking into account the scatter of the test.

Whatever the type of lime, linear swelling after immersion in water for four days, measured according to the CBR method, were also at a comparable level and less than 0.15% in all cases.

These tests showed that the anti-dust treatment according to the invention did not significantly modify the effects of quicklime on natural soils, the bearing was improved and swelling was reduced in the same proportions whatever the type of lime.

It should be understood that the present invention is in no way limited to the embodiments described above and that many modifications may be made thereto within the scope of the accompanying claims.

What is claimed is:

1. A process for preparing a composition for treating and stabilizing soils in the form of a powder having a particle size less than 5 mm, a fraction of which is formed from finer particles, comprising the steps of:

grinding a binder consisting of quicklime into said powder; and adding to the quicklime a non-aqueous fluid additive having a power to agglomerate said finer particles in an amount sufficient to obtain agglomerates of said finer particles which, in presence of humidity, liberate said finer particles.

2. The process of claim 1, comprising the steps of adding the non-aqueous fluid additive to the powder of ground quicklime and of blending the obtained composition.

3. The process of claim 1, comprising the steps of adding the non-aqueous fluid additive to the quicklime and of grinding the quicklime added with said non-aqueous fluid additive into said powder during said step of adding, with simultaneous blending.

4. The process of claim 3, comprising the steps of adding the non-aqueous fluid additive to the quicklime and of grinding the quicklime added with said non-aqueous fluid additive into said powder after said step of adding, with simultaneous blending.

5. The process of claim 1, including lightly heating the additive before it is added, so as to increase its fluidity and to improve the conditions of the step of adding.

6. The process of claim 1, wherein said non-aqueous fluid additive is hydrophobic and loses its agglomerating power during hydration of at least part of the quiklime.

7. The process of claim 1, comprising an at least partial evaporation of the non-aqueous fluid additive at reaction temperature between quicklime and water.

8. The process of claim 1, wherein the non-aqueous fluid additive is a compound selected from the group consisting of mineral oils, polyolefins and mixtures thereof.

9. The process of claim 1, wherein the quicklime is ground into a powder having a particle size distribution in which the particles smaller than 32 μm represent less than 30% of the total composition and the particles larger than 1 mm represent less than 20% of the total composition.

10. The process of claim 1, wherein the ground quicklime which is added with said non-aqueous fluid additive has a reactivity less than 25 minutes.

* * * * *